United States Patent [19]

Yamauchi et al.

[11] Patent Number: 5,285,841
[45] Date of Patent: Feb. 15, 1994

[54] METAL MOLD COOLING DEVICE

[75] Inventors: Noriyoshi Yamauchi; Hitoshi Ishida; Nobuo Iwakuni; Akio Kobashi, all of Fuchu, Japan

[73] Assignee: Ryobi Ltd., Hiroshima, Japan

[21] Appl. No.: 11,539

[22] Filed: Feb. 1, 1993

[30] Foreign Application Priority Data

Feb. 12, 1992 [JP] Japan .................................. 4-59059

[51] Int. Cl.⁵ .............................................. B22D 27/04
[52] U.S. Cl. .................................. 164/348; 164/154; 164/157
[58] Field of Search ............... 164/348, 157, 443, 485, 164/126, 128, 154

[56] References Cited

U.S. PATENT DOCUMENTS

| | | |
|---|---|---|
| 4,278,230 | 7/1981 | Allen ................................. 249/81 |
| 4,976,305 | 12/1990 | Tanaka et al. ................. 164/154 |

FOREIGN PATENT DOCUMENTS

| | | | |
|---|---|---|---|
| 384773 | 1/1988 | Fed. Rep. of Germany. | |
| 2101365 | 5/1987 | Japan ................................. | 164/128 |
| 3-180263 | 8/1991 | Japan ................................. | 164/348 |

OTHER PUBLICATIONS

Patent Abstracts of Japan vol. 8, No. 249, Nov. 15, 1984, (JPA 59-125257) p. 79.
Patent Abstracts of Japan vol. 9, No. 213, Aug. 30, 1985 (JPA 60-72641) p. 87.
Patent Abstracts of Japan vol. 12, No. 109, Apr. 8, 1988 (JPA 62-240150) p. 161.

Primary Examiner—Kurt Rowan
Assistant Examiner—Erik R. Puknys
Attorney, Agent, or Firm—Sughrue, Mion, Zinn, Macpeak & Seas

[57] ABSTRACT

A metal mold cooling device capable of employing a cooling pipe having a small diameter insertable into a cooling hole having a small diameter, and capable of performing fine supply control of a cooling liquid to the metal mold for fine temperature control thereto. A cooling pipe is connected to a compressed air source through a pipe and a first change-over valve. Further, the pipe is connected to a branch pipe to which a second change-over valve is connected. A hermetic cooling liquid tank connected to a water source is connected to the second change-over valve. A third change-over valve is provided between the compressed air source and the cooling liquid tank so as to apply pneumatic pressure onto a surface of the cooling liquid in the cooling liquid tank. Since the cooling liquid tank is provided in addition to the water source, pneumatic pressure from the compressed air source can be utilized. The cooling liquid in the cooling liquid tank is compressed and is supplied to the cooling pipe. Therefore, spraying is achievable even by a cooling pipe having a small diameter. Further, supply of the cooling liquid can be finely controlled by controlling valve opening timing of each of the change-over valves.

7 Claims, 1 Drawing Sheet

METAL MOLD COOLING DEVICE

BACKGROUND OF THE INVENTION

The present invention relates to a metal mold cooling device, and more particularly, to such device capable of introducing sufficient amount of a cooling liquid into a cooling hole of the metal mold, the hole having relatively small diameter.

Cooling to the metal mold at every predetermined cycle is required so as to produce desirable cast products. To this effect, conventionally, a cooling liquid such as a water is ejected into a cooling hole formed in the metal mold so as to remove evaporation heat therefrom. For example, according to the metal mold cooling technique disclosed in Japanese Patent Application Kokai Nos. 61-108462 and 63-299848, a pipe connected to an air source is inserted into the cooling hole drilled into the metal mold, and a water supplying pipe branched from the pipe is connected to a water tank. Water in the water tank is introduced into the pipe through the water supplying pipe by making use of a negative pressure generated within the pipe for ejecting the water at a tip end of the pipe.

Japanese Patent Application Kokai No. 60-72641 discloses improvement in a metal mold temperature control in which a cooling passage is provided in the metal mold for selectively ejecting one of liquid, gas-(air) and liquid/gas mixture into the passage. To this effect, a cooling pipe is connected to an inlet opening of the cooling passage, and the cooling pipe is branched into first branch pipe to which a liquid tank is connected and a second branch pipe to which an air tank is connected. The first and second branch pipes have first and second change-over valves, respectively. By controlling valve opening timing of these change-over valves by means of a timer, one of the liquid, gas and liquid/gas mixture is selectively introduced into the cooling passage.

However, in the device disclosed in the Japanese patent application Kokai Nos. 61-108462 and 63-299848, cooling liquid ejection from the ejection opening of the pipe is only achievable in a case where a cross-sectional area of the pipe is greater than that of the water supplying pipe. It is impossible to perform water ejection if the cross-sectional area of the pipe is smaller than that of the water supplying pipe. Therefore, if the pipe has a small cross-sectional area, the cross-sectional area of the water supplying pipe must be designed to be further smaller than that of the pipe. As a result, insufficient cooling water supply results. Particularly, if the cooling hole has an extremely small diameter to such extent of a tip end portion of a cast removal pin, such drawbacks is brought into highlighted problem.

In the device disclosed in the Japanese Patent Application Kokai No. 60-72641, if only the cooling liquid such as water is supplied into the metal mold cooling passage in a case where the latter has the small diameter, the water is evaporated within the passage, thereby increasing the pressure in the passage. Thus, subsequent cooling liquid cannot be introduced into the passage. Further, in supply of the liquid/gas mixture, if the pneumatic pressure is greater than the hydraulic pressure, cooling liquid supply may be restrained, and reversely, if the hydraulic pressure is greater than the pneumatic pressure, air supply may be restrained. Accordingly, fine temperature control to the metal mold may not be achievable. In order to obviate this drawback, pressure control units are respectively required in the liquid tank and the air tank, which in turn, renders the overall device intricate.

SUMMARY OF THE INVENTION

Thus, it is an object of the present invention to provide a metal mold cooling device capable of eliminating the above described conventional drawbacks, and capable of employing a cooling pipe having a small diameter and insertable into a cooling hole having a small inner diameter and also capable of performing fine temperature control to the metal mold.

In order to attain the above objects, the present invention provides a metal mold cooling device for cooling a metal mold formed with a cooling hole, the device including a cooling pipe inserted into the cooling hole, the cooling pipe having one end serving as a cooling liquid ejection opening and another end connected to a pipe member for supplying the cooling liquid, the pipe member being branched into a first pipe connected to a cooling liquid supplying means and a second pipe connected to a compressed air supplying means. The improvement comprises the compressed air supplying means and the cooling liquid supplying means.

The compressed air supplying means includes a first change-over valve and a compressed air source. The compressed air in the compressed air source is supplied to the cooling pipe upon valve opening operation of the first change-over valve. The cooling liquid supplying means includes a second change-over valve, a hermetical cooling liquid tank connected to the second change-over valve, and a third change-over valve disposed between the compressed air source and the cooling liquid tank. The compressed air is applied to a surface of the cooling liquid accumulated in the cooling liquid tank upon valve opening operation of the third change-over valve. The cooling liquid in the cooling liquid tank is supplied to the cooling pipe under pressure during a valve opening phase of the second change-over valve by making use of a pressure of the compressed air introduced into the cooling liquid tank through the third change-over valve.

Thus, upon valve opening operation of the third change-over valve, compressed air in the compressed air source is applied onto the surface of the cooling water accumulated in the hermetic cooling liquid tank for compressing the cooling liquid. Upon valve opening operation of the first change-over valve, the compressed air in the compressed air source is supplied into the cooling pipe, and upon valve opening operation of the second change-over valve, the compressed cooling liquid is also supplied into the cooling pipe. Consequently, liquid/gas mixture is ejected from the ejection opening.

BRIEF DESCRIPTION OF THE DRAWINGS

A single

DETAILED DESCRIPTION OF THE PREFERRED EMBODIMENTS

Figure 1:
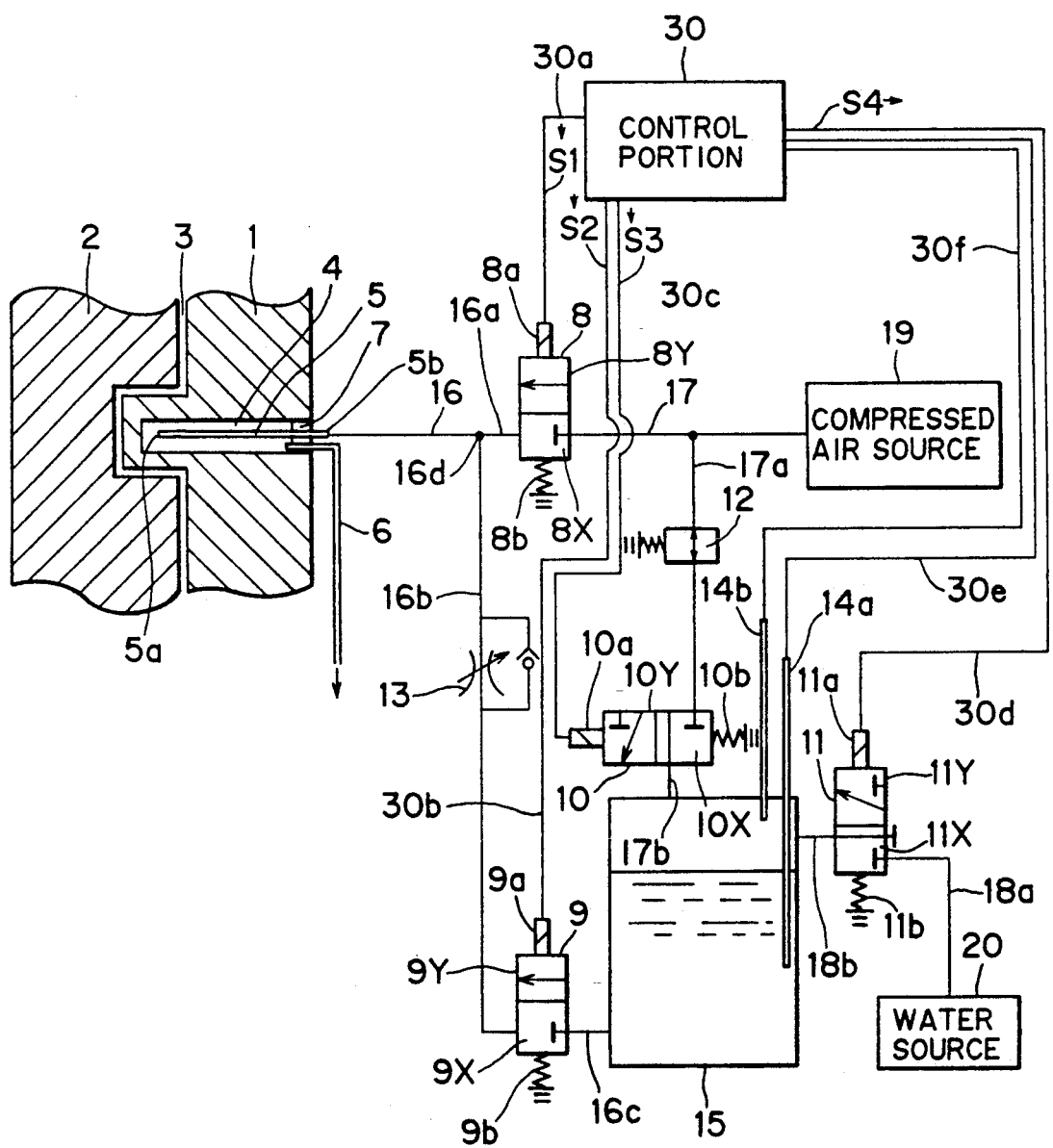
FIG. 1 is a schematic view showing a metal mold cooling device according to one embodiment of the present invention.

A metal mold cooling device according to one embodiment of this invention will next be described with reference to FIG. 1. Metal molds 1 and 2 have parting faces where a cavity 3 is defined. In the vicinity of the cavity 3, a cooling hole 4 is formed in the metal mold 1.

A cooling pipe 5 having a small diameter is insertedly positioned in the cooling hole 4. The cooling pipe 5 has one end serving as an ejection opening 5a. Further, a discharge pipe (water discharge pipe) 6 is disposed whose one end faces with the cooling hole 4 and whose another end is connected to a discharge water receiving portion (not shown). The cooling pipe 5 and the discharge pipe 6 are fixedly secured to a metal cap 7 threadingly engaged with an inlet of the cooling hole 4.

Another end 5b of the cooling pipe 5 is connected to a pipe 16 which allows cooling liquid (water) and compressed air to pass therethrough. The pipe 16 has a branch point 16d to which first and second branch pipes 16a and 16b are connected. The first branch pipe 16a is connected to an output port of a first change-over valve (electromagnetic valve) 8, whose inlet port is connected to a compressed air source 19 through a pipe 17. The first change-over valve 8 is provided with a solenoid 8a and a spring 8b. The solenoid 8a is connected to a control portion 30 through a line 30a. The spring 8b is adapted for maintaining valve closing position 8X of the first change-over valve 8 so as to shut off the fluid communication between the compressed air source 19 and the pipe 16. The solenoid 8a is adapted for moving the first change-over valve 8 to a valve opening position 8Y against the biasing force of the spring 8b in response to a compressed air supply signal S1 sent from the control portion 30. This position 8Y permits the compressed air source 19 to communicate with the pipe 16. The pipe 16, the first branch pipe 16a, the first change-over valve 8, the pipe 17, the compressed air source 19 and the line 30a will constitute compressed air supplying means for supplying the compressed air to the cooling pipe 5.

Next, cooling liquid supplying means will be described. The second branch pipe 16b is connected, through a flow rate regulation valve 13, to an output port of a second change-over valve (electromagnetic valve) 9 whose inlet port is connected to a hermetical cooling liquid tank 15 (hereinafter simply referred to as "water tank 15") through a pipe 16c. The second change-over valve 9 is provided with a solenoid 9a and a spring 9b. The solenoid 9a is connected to the control portion 30 through a line 30b. The spring 9b is adapted for maintaining valve closing position 9X of the second change-over valve 9 so as to shut off the fluid communication between the water tank 15 and the pipe 16. The solenoid 9a is adapted for moving the second change-over valve 9 to a valve opening position 9Y against the biasing force of the spring 9b in response to a water supply signal S2 sent from the control portion 30. This position 9Y permits the water tank 15 to communicate with the pipe 16. In this case, the amount of water flowing through the second branch pipe 16b is subjected to control by way of the flow rate regulation valve 13.

The cooling liquid supplying means further includes a third change-over valve 10 and a pressure regulator valve 12 for controlling inner pressure within the water tank 15. That is, the pressure regulator valve 12 is provided on a pipe 17a branching from the pipe 17, and the branch pipe 17a is connected, through the regulator valve 12, to an inlet port of the third change-over valve (electromagnetic valve) 10 whose output port is connected to an internal space of the water tank 15 through a pipe 17b. The third change-over valve 10 is provided with a solenoid 10a and a spring 10b. The solenoid 10a is connected to the control portion 30 through a line 30c. The spring 10b is adapted for maintaining valve closing position 10X of the third change-over valve 10 so as to shut off the fluid communication between the water tank 15 and the compressed fluid source 19. The solenoid 10a is adapted for moving the third change-over valve 10 to a valve opening position 10Y against the biasing force of the spring 10b in response to a pneumatic pressure application signal S3 sent from the control portion 30. This position 10Y permits the water tank 15 to communicate with the compressed air source 19. In this case, air flowing through the pipe 17a undergoes pressure control by way of the pressure regulator valve 12. Therefore, controlled pressure is applied to the surface of the water accumulated in the water tank 15 in order to urge water in the water tank 15 to direct toward the pipe 16.

The metal mold cooling device according to the illustrated embodiment also includes water supplementing means for supplementing water into the water tank 15. A lowermost level detector 14a for detecting a lower limit level of water in the water tank 15 and an uppermost level detector 14b for detecting an upper limit water level are disposed in the water tank 15. These detectors 14a and 14b are connected to the control portion 30 through lines 30e and 30f, respectively. Further, a water supplemental change-over valve (electromagnetic valve) 11 is provided which has an inlet port connected to a water source 20 through a pipe 18a and has an outlet port connected to the water tank 15 through a pipe 18b. The water supplemental change-over valve 11 is provided with a solenoid 11a and a spring 11b. The solenoid 11a is connected to the control portion 30 through a line 30d. The spring 11b is adapted for maintaining valve closing position 11X of the water supplemental change-over valve 11 so as to shut off the fluid communication between the water tank 15 and the water source 20. The solenoid 11a is adapted for moving the water supplemental change-over valve 11 to a valve opening position 11Y against the biasing force of the spring 11b in response to a water supplementing signal S4 sent from the control portion 30. This position 11Y permits the water tank 15 to communicate with the water source 20. Incidentally, the water supplementing signal S4 is outputted in response to a detection signal indicative of detection of the lowermost water level, the detection being made by the lowermost water level detector 14a.

Next, operation of the metal mold cooling device according to the embodiment will be described. First, the first through third change-over valves 8, 9 and 10 have valve closing positions 8X, 9X and 10X, and accordingly, the cooling pipe 5 is disconnected from the compressed air source 19 and the water tank 15. With this state, when the pneumatic pressure application signal S3 is transmitted from the control portion 30 to the solenoid 10a of the third change-over valve 10, the third change-over valve 10 is changed over to its valve opening position 10Y, so that the compressed air source 19 is in fluid communication with the water tank 15 through the pipes 17, 17a, pressure regulator valve 12, the third change-over valve 10, and the pipe 17b. As a result, a pneumatic pressure can be applied to the surface of the water contained in the water tank 15.

Upon elapse of predetermined time period, compressed air supply signal S1 and the water supply signal S2 are simultaneously transmitted from the control portion 30 to the first and second change-over valves 8 and 9, respectively. Thus, the first and second change-over valves 8 and 9 are changed over to their valve opening positions 8Y and 9Y. Accordingly, the water tank 15 is in fluid communication with the cooling pipe 5 through the pipe 16c, the second change-over valve 9, the flow rate regulator valve 13, the second branch pipe 16b and the pipe 16. Simultaneously, the compressed air source 19 is in fluid communication with the cooling pipe 5 through the pipe 17, the first change-over valve 8, the first branch pipe 16a and the pipe 16. As a result, the cooling water subjected to water amount control by the flow rate regulator valve 13 and the pressure regulator valve 12 along with the compressed air are ejected from the ejection opening 5a toward a bottom portion of the cooling hole 4. Non evaporated water is discharged from the cooling hole 4 through the discharge pipe 6.

When the transmission of the compressed air supply signal S1 and the water supply signal S2 are terminated upon elapse of a predetermined period, the first and second change-over valves 8 and 9 are restored to their valve closing positions 8X and 9X by the biasing forces of the springs 8b and 9b. Therefore, the water and air supply to the cooling pipe 5 is suspended. Next, transmission of the pneumatic pressure application signal S3 from the control portion 30 is terminated, so that the third change-over valve 10 is moved back to its valve closing position 10X by the biasing force of the spring 10b. Thus, the water tank 15 is disconnected from the compressed air source 19, whereupon application of pneumatic pressure onto the surface of the water in the water tank 15 is stopped.

Lower limit level of the water in the water tank 15 is detected by the lowermost water level detector 14a, so that the lowermost water level signal is outputted to the control portion 30 through the line 30e. In response to the signal, water supplementing signal S4 is outputted to the solenoid 11a of the water supplementing change-over valve 11. As a result, the water supplementing change-over valve 11 is moved from its valve closing position 11X to the valve opening position 11Y. Thus, water in the water source 20 can be supplemented into the water tank 15 through the pipe 18a, the water supplementing change-over valve 11 and the pipe 18b. If the supplemented water reaches the uppermost water level, the uppermost water level detector 14b detects the uppermost level and the uppermost water level signal is outputted to the control portion 30 through the line 30f. As a result, the water supplementing change-over valve 11 is moved back to the valve closing position 11X by the biasing force of the spring 11b so as to disconnect the water tank 15 from the water source 20. Incidentally, the control portion 30 is arranged to suppress output of the water supply signal S4 during transmission of the pneumatic pressure application signal S3. This is due to the fact that if the water supplementing change-over valve 11 is opened during valve opening phase of the third change-over valve 10, compressed air may be flowed into the water supplementing change-over valve 11 due to the compressed air pressure, and therefore, it becomes impossible to apply a predetermined level of pneumatic pressure onto the surface of the water in the water tank 15.

Incidentally, in the above described embodiment, water amount control is performed by the flow rate regulator valve 13 and the pressure regulator valve 12. However, the water amount control is also achievable by controlling the flow rate regulator valve 13 while maintaining the pressure regulator valve 12 at a constant level. Alternatively, this control is also achievable by controlling the pressure regulator valve 12 while maintaining the flow rate regulator valve 13 at a constant level. Thus, because of the disposition of the flow rate regulator valve 13 and the pressure regulator valve 12 for the purpose of the water amount control, amount of water to be supplied to the cooling pipe 5 can be easily carried out so as to precisely cool the metal molds 1, 2.

In the metal mold cooling device of the present invention, even though the positional relationship between the pipe 16 and the branch pipe 16a would be similar to that between the conventional pipe and the water supplying pipe such as those described in the Japanese Patent Application Kokai No. 63-299848, the present invention has a structure in which the cooling water in the hermetic water tank 15 is subjected to pneumatic pressure, and such water is flowed into the branch pipe 16b. Therefore, the cooling water is urged to be flowed toward the water supplying pipe 16. Consequently, no consideration is required with respect to the relation of cross-sectional area of the cooling pipe 5 and the pipe 16, which relation must be considered in the JP Kokai reference. Thus, in the present invention, a cooling pipe having a small diameter can be employed, and desired amount of the cooling water can surely be supplied to the cooling hole having a small diameter. Accordingly, the metal mold can be stably and easily cooled.

Further, in the present invention, independent pressure control to the liquid tank and the air tank is not required, which control is required in the invention described in the Japanese patent application Kokai No. 60-72641. That is, in the present invention, pneumatic pressure is approximately equal to the hydraulic pressure because of the application of the compressed air pressure onto the surface of the water contained in the hermetic water tank 15 by making use of the compressed air to be supplied to the cooling pipe 5 from the compressed air source 19, thereby positively directing the cooling water toward the cooling pipe.

Furthermore, by controlling the first through third change-over valves at optimum timing, it becomes possible to finely control the temperature of the metal mold, to thereby stabilizingly produce molded products without any variation in quality.

While the invention has been described in detail and with reference to specific embodiments thereof, it would be apparent to those skilled in the art that various changes and modifications may be made therein without departing from the spirit and scope of the invention.

What is claimed is:

1. A metal mold cooling device for cooling a metal mold formed with a cooling hole, the device including a cooling pipe inserted into the cooling hole, the cooling pipe having one end serving as a cooling liquid ejection opening and another end connected to a pipe member for supplying the cooling liquid, the pipe member being branched into a first pipe connected to a cooling liquid supplying means and a second pipe connected to a compressed air supplying means, and the improvement comprising:

the compressed air supplying means comprising a first change-over valve and a compressed air source, the compressed air in the compressed air source being supplied to the cooling pipe upon valve opening operation of the first change-over valve; and the cooling liquid supplying means comprising a second change-over valve, a hermetical cooling liquid tank connected to the second change-over valve, and a third change-over valve disposed between the compressed air source and the cooling liquid tank, the compressed air being applied to a surface of the cooling liquid accumulated in the cooling liquid tank upon valve opening operation of the third change-over valve, the cooling liquid in the cooling liquid tank being supplied to the cooling pipe under pressure during a valve opening phase of the second change-over valve by making use of a pressure of the compressed air introduced into the cooling liquid tank through the third change-over valve.

2. The metal mold cooling device as claimed in claim 1 further comprising a control means for controlling valve opening timings of the first through third change-over valves.

3. The metal mold cooling device as claimed in claim 2, wherein the cooling liquid supplying means further comprises a flow rate regulation valve provided on the first pipe and between the second change-over valve and the pipe member.

4. The metal mold cooling device as claimed in claim 2, wherein the cooling liquid supplying means further comprises a pressure regulator valve provided between the compressed air source and the third change-over valve.

5. The metal mold cooling device as claimed in claim 3, wherein the cooling liquid supplying means further comprises a pressure regulator valve provided between the compressed air source and the third change-over valve.

6. The metal mold cooling device as claimed in claim 5, further comprising cooling liquid supplementing means connected to the cooling liquid tank for supplementing cooling liquid into the cooling liquid tank, the supplementing means comprising a cooling liquid source, a fourth change-over valve connected between the cooling liquid source and the cooling liquid tank, a lowermost level detector disposed in the cooling liquid tank, and an uppermost level detector disposed in the cooling liquid tank, the fourth change-over valve being movable in a first change-over position for introducing the cooling liquid in the cooling liquid source into the cooling liquid tank in response to a detection of a lowermost level by the lowermost level detector.

7. The metal mold cooling device as claimed in claim 6, wherein the lowermost level detector, the uppermost level detector and the fourth change-over valve are connected to the control means.

* * * * *